US 8,548,485 B2

(12) United States Patent
Gheorghiu et al.

(10) Patent No.: US 8,548,485 B2
(45) Date of Patent: Oct. 1, 2013

(54) METHODS AND SYSTEMS FOR ADAPTIVE BROADCASTING AND MULTICASTING IN A WIRELESS NETWORK (75) Inventors: Valentin Alexandru Gheorghiu, Tokyo (JP); Ravi Palanki, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 12/731,834

(22) Filed: Mar. 25, 2010

(65) Prior Publication Data
US 2010/0246469 A1 Sep. 30, 2010

Related U.S. Application Data (60) Provisional application No. 61/163,711, filed on Mar. 26, 2009.

(51) Int. Cl.
*H04W 74/00* (2009.01)
(52) U.S. Cl.
USPC .......................... 455/452.1; 370/338
(58) Field of Classification Search
USPC ....................... 455/452.1; 370/338
See application file for complete search history.

(56) References Cited

U.S. PATENT DOCUMENTS

| 2005/0083873 A1* | 4/2005 | Yamamoto ................. 370/328 |
| 2007/0178916 A1 | 8/2007 | Sorbara et al. |
| 2008/0056198 A1 | 3/2008 | Charpentier et al. |
| 2008/0076359 A1* | 3/2008 | Charpentier et al. ........ 455/63.1 |
| 2008/0261545 A1* | 10/2008 | Miyoshi et al. ............ 455/127.1 |
| 2009/0060010 A1* | 3/2009 | Maheshwari et al. ........ 375/211 |
| 2009/0073911 A1 | 3/2009 | Cheon et al. |
| 2010/0203916 A1* | 8/2010 | Tiwari et al. ................ 455/513 |
| 2010/0278137 A1* | 11/2010 | Kwon et al. ................. 370/330 |

FOREIGN PATENT DOCUMENTS

EP 1524791 4/2005

OTHER PUBLICATIONS

International Search Report and Written Opinion—PCT/US2010/028805, International Search Authority—European Patent Office—Aug. 17, 2010.
Motorola, "MBMS Modulation and Coding State Selection," R2-061985, 3GPP TSG RAN WG2 ad-hoc on LTE, Cannes, France, Jun. 27-30, 2006, pp. 1-6.
Taiwan Search Report—TW099109161—TIPO—Feb. 20, 2013.

* cited by examiner

*Primary Examiner* — Marcos Batista
(74) *Attorney, Agent, or Firm* — Ashish L. Patel (57) ABSTRACT

Systems and methods are provided for adaptively transmitting information to a plurality of nodes in a local area of a base station. The base station receives channel quality information from one or more of the nodes within the local area, selects a transmission rate for a downlink transmission corresponding to the lowest channel qualities, and simultaneously transmits a message to the nodes at the selected transmission rate.

30 Claims, 4 Drawing Sheets

METHODS AND SYSTEMS FOR ADAPTIVE BROADCASTING AND MULTICASTING IN A WIRELESS NETWORK

This application claims benefit of priority to U.S. Provisional Patent Application No. 61/163,711, filed on Mar. 26, 2009, the disclosure of which is hereby incorporated into this specification in its entirety by reference.

BACKGROUND

I. Field of the Invention

The following description relates to wireless communications systems, and more particularly to systems and methods for providing adaptive broadcast and/or multicast in small areas.

II. Relevant Background

Wireless wide area network systems that cover metropolitan areas and larger regions may broadcast information (e.g., data, voice, audio and video) to multiple terminals simultaneously. These networks may also transmit information using multicast techniques in which terminals share channels that are distributed throughout the network. Broadcasting and multicasting can be contrasted with unicasting, in which copies of a single channel are transmitted to individual terminals.

In both broadcast and multicast techniques, multiple identical transmissions may be required to ensure all terminals correctly receive the transmitted information. For instance, if one terminal fails to receive a portion of a multicast message, that portion may be retransmitted to all the terminals. Such retransmissions inefficiently consume network resources. Moreover, current methods for broadcasting in wide area networks are not optimized to operate within small areas, such as in the vicinity of one or two base stations.

SUMMARY

Systems and methods are provided to adaptively broadcast and/or multicast information in the local area of a base station. In one aspect, channel quality indicators (CQI) can be determined in connection with a broadcast transmission to adaptively modulate and encode subsequent transmissions. In another aspect, hybrid automatic repeat requests (HARQ) can be utilized to improve the reliability of broadcast transmissions.

In exemplary systems and methods, a base station may receive channel quality information from one or more nodes within a local area, selects a transmission rate for a downlink transmission corresponding to the lowest, or one of the lowest channel qualities, and simultaneously transmits a message to the nodes at the selected transmission rate.

DETAILED DESCRIPTION

Figure 1:
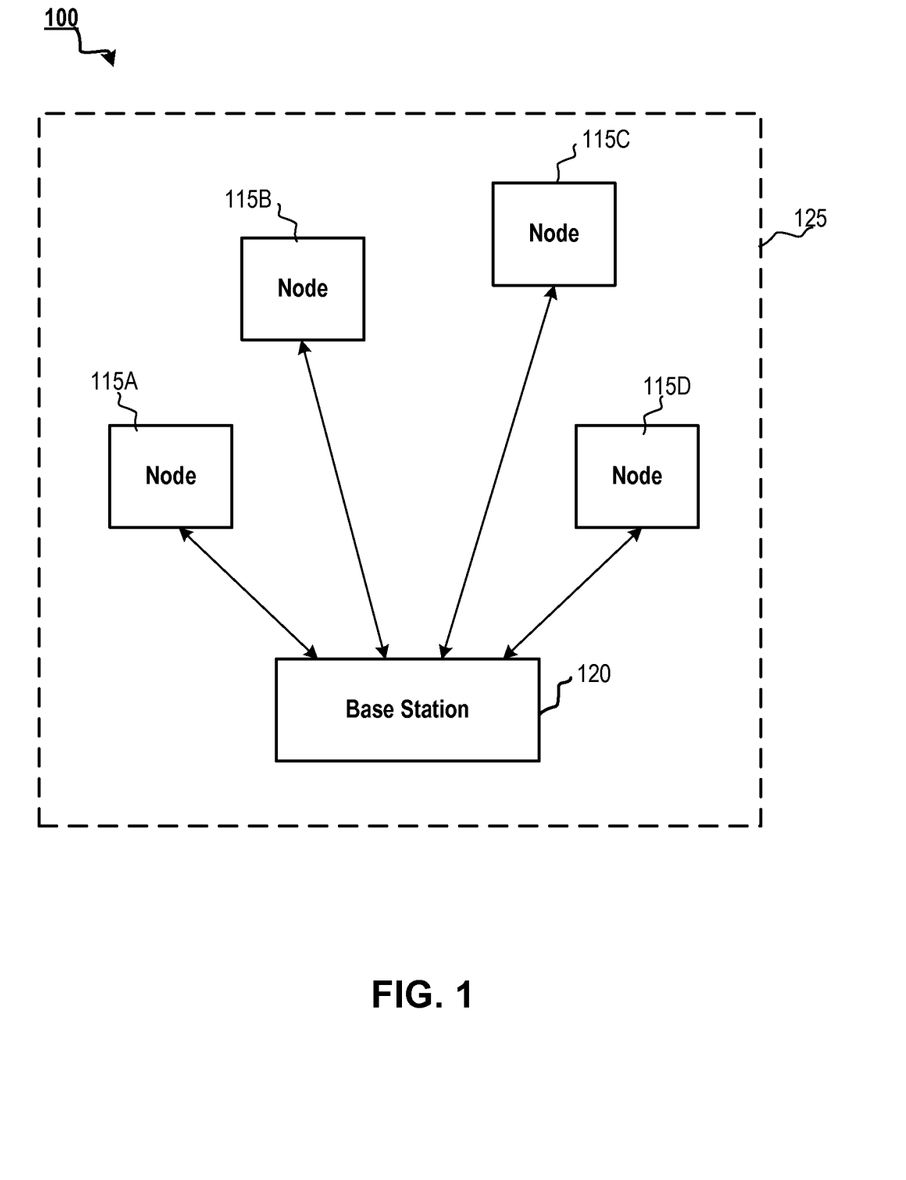
FIG. 1 illustrates an exemplary multiple access wireless communication environment.

FIG. 1 illustrates an exemplary information network 100 that communicatively links a number of remote nodes 115 to a base station 120 within a local area 125. The network 100 may be any type of communication network that uses wired and/or wireless transmission. In some embodiments, the network 100 may be a wireless communication network that exchanges information with mobile nodes according to a network communication standard, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA). A CDMA network may implement a radio technology such as Universal Terrestrial Radio Access (UTRA), CDMA2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP).

The network 100 illustrated in FIG. 1 is a simplified example having only a single base station 120 and a few nodes 115 located in the local area 125. However, in some embodiments, the local area 125 may include different numbers and types of base stations and nodes. In addition, the network 100 can be connected to other networks, contain one or more other sub-networks, and/or be a sub-network within another network.

The nodes 115 can be wired or wireless devices that communicate over communications networks, such as network 100. The nodes 115 can be, for example, mobile devices (e.g., cellular telephones, smart phones, personal digital assistants, Session Initiation Protocol (SIP) phones, a wireless local loop (WLL) stations, laptop computers, vehicle navigation systems), general-purpose computers, servers, network elements (e.g., gateways, terminals, switches, repeaters, routers), or application-specific devices (e.g., utility meters, sensors, set-top boxes, game devices, home appliances). In embodiments where the nodes 115 are mobile devices, the nodes 115 can also be referred to as subscriber units, subscriber stations, mobile stations, remote stations, remote terminals, access terminals, user terminals, wireless communication devices, user agents, user devices, or user equipment (UE).

As shown in FIG. 1, the nodes or UEs 115 are located within the local area 125 of the base station 120 and may utilize the base station 120 for wireless communications through network 100. The local area 125 is a limited region in the proximity of the base station 120. For instance, where the network 100 is a wireless network, the boundary of the local area 125 may be the transmission range of the base station 120. In some embodiments, the local area 125 may be a sector and/or a cell of the base station 120. The local area 125 may have different sizes and shapes. Furthermore, different area sizes can be supported and, for example, a broadcast or multicast service can be provided to the local area 125 and/or additional neighboring areas served by other base stations.

The base station 120 may be a fixed or mobile device that communicates with the nodes or UEs 115 and other devices inside or outside network 100. For instance, the base station 120 may relay data and/or messages transmitted between two of the nodes 115. In addition, the base station 120 may transport information received from the nodes 115 to another base station in network 100, to a wide-area network, to a global network (e.g., the Internet), a pole-switched telephone network (PSTN) and/or an Internet protocol (IP) telephone network. In some embodiments where network 100 is a communication network for mobile devices, the base station 120 may also be referred to as a "Node B" or an "Evolved Node B" (eNB).

The base station 120 can transmit information to the nodes 120 over a downlink channel (i.e., forward link channel). Furthermore, the base station 115 can receive information from the nodes 115 over an uplink communication channel (i.e., reverse link channel). The base station 120 can also be a multiple-in-multiple-out system. Additionally, the base station 120 can operate in an OFDMA wireless network (such as 3GPP, 3GPP2, LTE, etc.).

The base station 120 may use broadcasting or multicasting in several situations. In some situations, broadcasting or multicasting may be used in latency sensitive applications that require transmission delays of 100 milliseconds or less. Such latency sensitive applications can include, for example, multi-user gaming, multi-user chat, remote-controlled vehicles, high-speed sensor networks, and other real-time or near real-time applications. In addition, broadcasting and multicasting that may be used in applications that, while not latency sensitive, require reliable delivery of messages. Such situations may include broadcasting and/or multicasting messages about disaster relief operations, emergency situations, and the like. In other situations, such as the delivery of advertising content, where latency or reliability is not a great concern, use of broadcasting and/or multicasting may consume fewer network resources.

Figure 2:
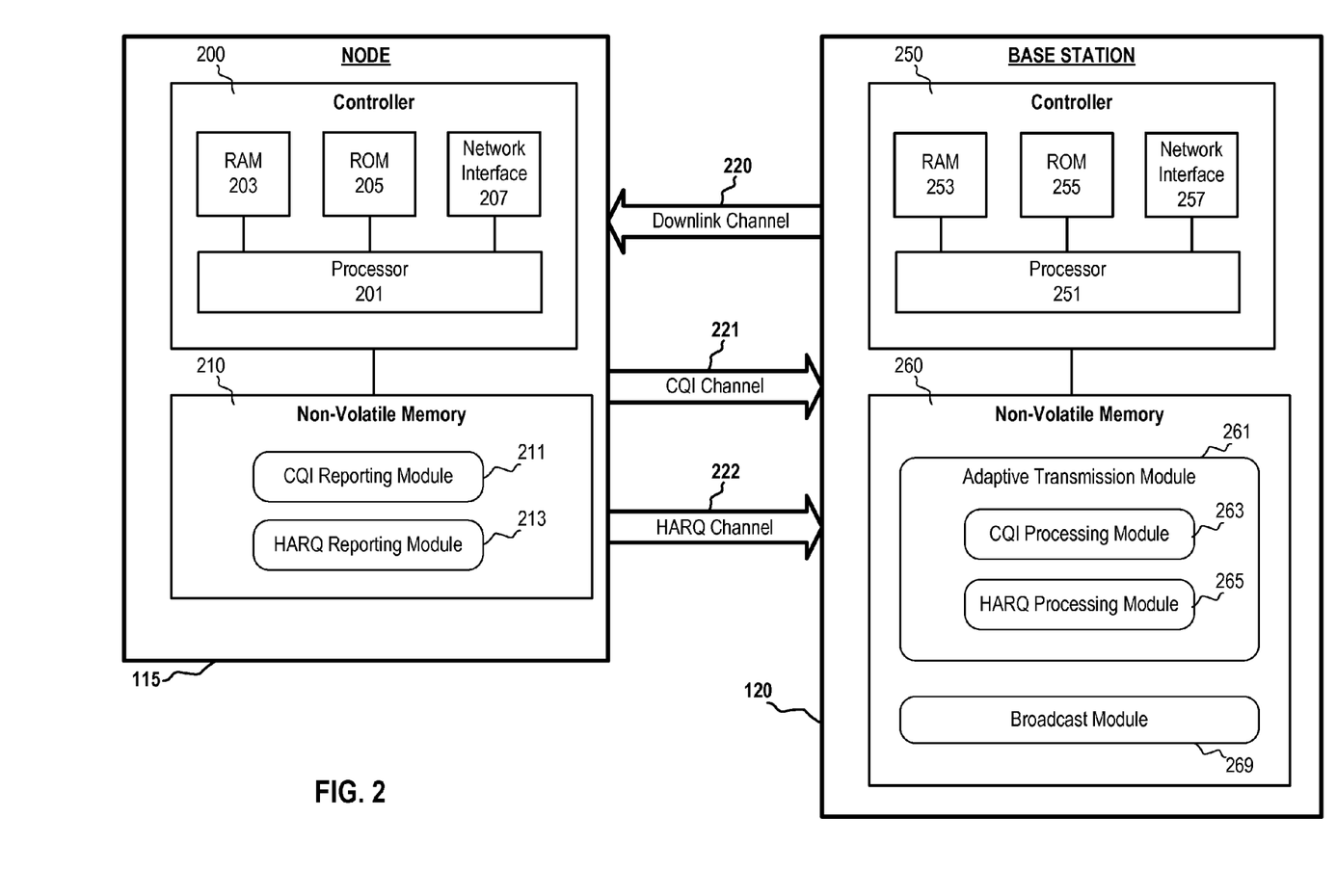
FIG. 2 illustrates functional diagrams of an exemplary node and an exemplary base station.

FIG. 2 illustrates an exemplary node or UE 115 and an exemplary base station 120. The node 115 may have a controller 200 and a non-volatile memory 210. The illustrated node 115 is a simplified example and may include other components that are not shown. For instance, the node 115 may include additional devices, such as power supplies, input/output devices, interface devices, user-input devices, sensors, antennas, data buses, graphic processors, displays and audio transducers.

The controller 200 may include a processor 201 coupled to a random access memory ("RAM") 203, a read-only memory ("ROM") 205, a network interface 207, and a non-volatile memory device 210. The processor 201 may be an electronic data processing device that executes program instructions recorded in computer-readable memory devices, including RAM 203, ROM 205 and/or non-volatile memory device 210. The processor 201 may be a general-purpose processor (e.g., INTEL or IBM), or a specialized, embedded processor (e.g., ARM).

The network interface device 207 may be a device that includes hardware (e.g., processors, transceivers, and modems), software (e.g., multi-layer protocol support, protocol conversion, data processing, data modulation, etc.), firmware, or a combination thereof operable to communicate with one or more elements external to node 115. The network interface device 207 exchanges information with the base station 120 to encode and decode information transmitted over one or more communication channels according to predefined transmission protocols. For instance, as illustrated in FIG. 2, the network interface device 207 may receive information from the base station 120 over a downlink channel 220, and provide information to the base station 120 over a CQI channel 221 and a HARQ channel 222.

The non-volatile memory device 210 may include any hardware, software, firmware, or combination thereof operable to store and retrieve information, including computer-readable program instructions and data. The non-volatile memory device 210 may be, for instance, a semiconductor, a magnetic or an optical-based information storage/retrieval device (e.g., flash memory, hard disk drive, CD-ROM, or flash RAM). Although the memory device 210 is depicted as a single medium, the device 210 may comprise additional storage media devices.

Additionally, the non-volatile memory device 210 may store computer-executable instructions (e.g., software, firmware, code, portions of code) and data (e.g., data compilations, databases, data set) that, when executed by the processor 201, control node 115 to perform particular functions. The computer-executable instructions may include a channel quality indicator (CQI) reporting module 211 and a hybrid automatic repeat request (HARQ) reporting module 213. Although not shown, the non-volatile memory device 210 may include other computer-executable instructions that control host 110 (e.g., a bootloader, an operating system, control modules, hardware drivers, codecs, user interfaces, productivity applications, messaging applications, network browsers, game software, media players, etc.).

The CQI reporting module 211 may control the node 115 to determine the quality of a communication channel, such as the downlink channel 220, and send messages reporting CQI information to the base station 120. The CQI information may be determined by the CQI reporting module 211 based on one or more messages received from the base station 120. For instance, CQI information may be determined based on received signal strength indication (RSSI), resend rate, dropped packets, bit error rates (BER) and/or latency (i.e., delay) of one or more messages received from the base station 120 over the downlink channel 220 or some other communication link with the base station 120.

In some instances, the CQI reporting module 211 determines the CQI information based on short-term information. For example, the CQI information may be determined from the most recent or the several most recent messages received from the base station 120. Additionally or alternatively, the CQI information can be based on long-term information. For instance, the CQI information may be determined from CQI information collected over a predetermined time period (e.g., a number of minutes, hours or days) and recorded, for instance, in the RAM 203 or the non-volatile memory device 210. Using the recorded CQI information, CQI reporting module 211 may statistically derive the CQI information. For instance, CQI information may be calculated based on the average RSSI of messages received in a one-hour time period. Of course, other statistical methods, channel quality parameters and time periods may be used and combined to calculate the CQI information.

The CQI reporting module 211 may provide the CQI information to the base station 120 over the CQI channel 221. In some embodiments, the network interface 207 transmits the CQI information in a channel quality message using an upper-layer network communication protocol. The CQI channel 221 can be a channel of a single frequency network (SFN) that uses one transmission frequency to provide one or more communication channels. In some embodiments, the single frequency network channel may include a number ("N") of orthogonal dimensions (e.g., CHU sequences) for different values of channel quality indicator (CQI), where N is an integer greater than or equal to one. The nodes 115 with similar channel quality may employ a corresponding dimension of the single frequency network (SFN) channel to report their CQI information to the base station 120.

The HARQ reporting module 213 may control the node 115 to determine whether downlink messages from the base station 120 were correctly received and/or decoded by node 115. In the event that a transmission from the base station 120 was not correctly received, the HARQ reporting module 213 may send a HARQ message to the base station 120. The HARQ message may include a non-acknowledgement (NAK) indicating that the node 115 did not correctly decode the downlink message. In some embodiments, when the node 115 correctly decodes a downlink transmission, the HARQ reporting module 213 may implicitly indicate to the base station 120 that the downlink transmission was correctly decoded by not transmitting any non-acknowledgement (NAK) indicator.

The HARQ reporting module 213 may establish a hybrid automatic repeat request (HARQ) channel 222 with the base station 120 over which hybrid automatic HARQ messages may be transmitted. The HARQ channel 222 can use an upper-layer and/or a physical layer of the network communication protocol. Use of upper-layer based acknowledgement provides several advantages, including eliminating a need for a new physical channel, allowing NAKs to be intermittently sent, and avoiding the need for power control/timing correction.

Use of the physical network layer by the HARQ reporting module 213 may allow the channel to be optimized for low latency applications. For instance, a SFN-non-acknowledgement (NAK) channel can include Physical Uplink Control Channel (PUCCH) resources allocated to the SFN-non-acknowledgement (NAK). A physical uplink control channel (PUCCH) is a transmission channel that carries signaling data. The PUCCH may transport acknowledgment responses and retransmission requests (ARQ, ACK, NAK), send service scheduling requests, and transfer channel quality information.

Turning now to the base station, FIG. 2 illustrates an exemplary base station 120 having a controller 250 and a non-volatile memory 260. The base station 120 may optimize broadcast and/or multicast transmission within local the 125 by adaptively modifying broadcast rates for the downlink channel 220. As described in greater detail below, based on the CQI messages and the HARQ messages received from the nodes 115, the base station 120 may select a transmission rate for broadcast services.

Controller 250 may include a processor 251 coupled to a random access memory ("RAM") 253, a read-only memory ("ROM") 255, and a network interface device 257. Of course, the base station 120 illustrated is a simplified example and may include other components that are not shown. For instance, the base station 120 may include additional devices, such as power supplies, input/output devices, interface devices, user-input devices, antennas, data buses, graphic processors, and display.

The processor 251 may be an electronic data processing device that executes program instructions recorded in computer-readable memory devices, including a RAM 253, a ROM 255 and/or a non-volatile memory device 260. The processor 251 may be a general-purpose processor (e.g., INTEL or IBM), or a specialized, embedded processor (e.g., ARM).

Network interface device 257 may be a device that includes hardware (e.g., processors, transceivers, and modems), software (e.g., multi-layer protocol support, protocol conversion, data processing, data modulation, etc.), firmware, or combination thereof operable to communicate with one or more elements external to the base station 120. The network interface device 257 exchanges information with the nodes 115 to encode and decode messages transmitted according to pre-defined transmission protocols. In some embodiments, the network interface device 257 exchanges information with the nodes 115 to encode and decode messages transmitted over communication channels such as the downlink channel 220, the CQI channel 221 and the HARQ channel 222.

The non-volatile memory device 260 may include any hardware, software, firmware, or combination thereof operable to store and retrieve information, including computer-readable program instructions and data. The non-volatile memory device 260 may be, for instance, a semiconductor, magnetic or optical-based information storage/retrieval device (e.g., flash memory, hard disk drive, CD-ROM, or flash RAM). Although the memory device 260 is depicted as a single medium, memory device 260 may comprise any additional number of storage media.

The non-volatile memory device 260 may store modules including computer-executable instructions (e.g., software, firmware, code, or portions of code) and data (e.g., data compilations, databases, data set) that, when executed by the processor 251, control node 115 to perform particular functions. The base station 120's non-volatile memory device 260 may store modules, including an adaptive transmission module 261 and broadcast module 269. While not shown in FIG. 2, the non-volatile memory device 260 may also include other computer-executable instructions that control host 110 (e.g., a bootloader, operating system, control modules, hardware drivers, etc.).

The adaptive transmission module 261 enables adaptive broadcast and/or multicast services based on the CQI report messages and the HARQ report messages received from the nodes 115. The adaptive transmission module 261 employs the CQI messages and/or the HARQ messages received from the nodes 115 to alter the transmission rate of the downlink channel 220. The adaptive transmission module 261 may have additional modules, including a CQI processing module 263 and a HARQ processing module 265.

The CQI processing module 263 may control the base station 120 to processes the CQI information received in messages from the nodes 115 over the CQI channel 221 via the network interface 257. Based on the received CQI information, the CQI processing module 263 may determine the lowest channel qualities or quality values. By adapting the broadcast transmission rate for the downlink channel 220 based on the lowest channel quality (or one of the lowest channel qualities), the base station 120 may better ensure that all the nodes 115, including the lowest geometry node in the local area 125, for example node 115C, correctly receives transmissions.

The HARQ processing module 265 may control the base station 120 to process the HARQ messages received from the nodes 115 over the HARQ channel 222 and determine whether the messages include NAK indicators. Detection of a non-acknowledgement (NAK) may trigger the base station 120 to retransmit a message to some or all of the nodes 115 in the local area 125. In some embodiments, the HARQ processing module 265 may treat the absence of a HARQ message to implicitly indicate an acknowledgement of the downlink message from all the nodes 115.

The broadcast module 269, when executed by the processor 251, may control the base station 120 to broadcast transmissions at a transmission rate determined by the adaptive transmission module 261. The broadcast module 269 may provide the downlink channel 220 that carries downlink transmissions to the nodes 115 in the area 125. The downlink channel 220 can employ physical layer channels similar to conventional unicast and/or multicast broadcast single frequency network (MBSFN), such as those associated with LTE.

Figure 3:
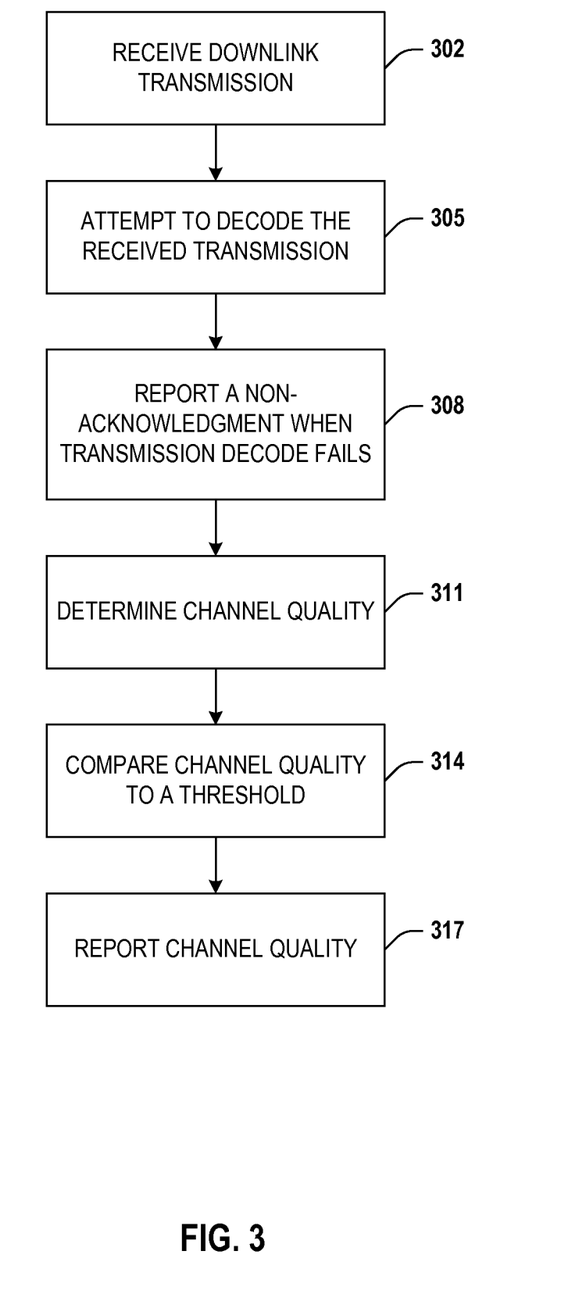
FIG. 3 illustrates an exemplary flow diagram of a process that may be performed by a node.

FIG. 3 illustrates an exemplary process performed by a node or UE such as, for example, by the nodes 115 shown in FIG. 2. The nodes 115 in the local area 125 may receive a downlink broadcast or multicast transmission from the base station 120 via the downlink channel 220. (Step 302.) In some embodiments, the transmissions from the base station 120 include a CQI reporting threshold. The CQI reporting threshold may be a static value that is predetermined and stored in the base station 120. Alternatively, the CQI reporting threshold may be a dynamic value that is determined by the base station 120's CQI processing module 263 based on the CQI information received from the nodes 115. In other embodiments, the CQI reporting threshold corresponds to the CQI information reported by the node in the local area 125 having the lowest channel quality for the downlink channel 220, such as exemplary node 115C (i.e., the lowest geometry user).

Based on one or more of the downlink transmissions from the base station 120 via the downlink channel 220, some or all of the nodes 115 in the local area 125 may attempt to decode the received transmission using the nodes' HARQ reporting module 213. (Step 305.)

The nodes 115 may determine that a downlink transmission failed to correctly decode when, for example, the transmission is incomplete (e.g., is too short, has missing segments and/or is missing data) or is corrupt (e.g., includes incorrect codes, has an improper format or structure, or fails a checksum). When the HARQ reporting module 213 fails to correctly decode the downlink transmission, the module may send a HARQ message, including a non-acknowledgement (NAK) indicator, to the base station 120. (Step 308.) The HARQ message can be sent over the HARQ channel 222, which may be a single frequency network channel that multiplexes messages from some of all of the nodes 115. In some embodiments, the nodes 115 may send the HARQ messages to the base station 120 anonymously such that the messages do not include unique identifiers of the respective nodes 115.

In the event that HARQ reporting module 213 successfully decodes the downlink transmission from the base station 120, the module may send a HARQ message including an acknowledgement (ACK) indicator to the base station 120. Alternatively, the HARQ reporting module 213 may not respond to the base station 120 when a downlink transmission is correctly decoded. In such case, the base station 120 may consider the lack of response to be an indication that its downlink message was successfully decoded by node 115C. By doing so, bandwidth of network 100 may be conserved.

In addition, the nodes' 115 respective CQI reporting modules 211 may determine the channel quality of the downlink channel 220 and, based on the determined channel quality, generates CQI information. (Step 311.) The CQI information may be any value connoting a relative channel quality. For instance, the nodes 115 may assign an integer number "N" (e.g., 1-10), a rating (e.g., A-F) and percentage (e.g., 0% to 100%) or any other figure of merit.

In some embodiments, the nodes 115 determine CQI information based on one or more of the downlink transmissions received from the base station 120. For example, the CQI reporting module 211 may determine the CQI information using a received signal strength indication (RSSI), a resend rate, a number of dropped packets, a bit error rate (BER) and/or a latency (i.e., delay) of one or more transmission received from the base station 120.

Node 115 may send a CQI message to the base station 120 reporting the determined the CQI information. (Step 317.) In some embodiments, the CQI message is transmitted over the CQI channel 221 established between the base station 120 and the nodes 115. Because the base station 120 may adapt a broadcast transmission rate based on any node 115's channel quality (rather than, for example, a particular node), the nodes 115 may provide CQI messages to the base station 120 anonymously.

Additionally or alternatively, the CQI messages may be identified to a subset of the nodes 115. For instance, the base station 120 may assign categories to one or more nodes. The categories may include the nodes 115 that have a similar channel quality (e.g., in the same ranges), that have the same transmission type (e.g., broadcast, multicast, venuecast) and/or that have the same service type (e.g., LTE, GSM, CDMA). The nodes may be identified to a particular category by a corresponding network identifier (e.g., using a Radio Network Temporary Identifier (RNTI), a MAC address or an IP address) that may be assigned to the nodes 115 the local area 125 by the base station 120 during a registration process. By categorizing the nodes 115, the base station 120 may conserve network resources when transmitting or retransmitting messages. For instance, the base station 120 may retransmit broadcast transmissions to the nodes within a category in which one of the nodes 115 has requested retransmission. The base station 120 may also retransmit a message to the nodes belonging to categories associated with a lower CQI range than the set of the nodes 115 that requested retransmission (e.g., broadcast or multicast).

The nodes 115 may report CQI information to the base station 120 periodically and/or in response to a transmission from the base station 120. Network bandwidth may be conserved by limiting the number of the nodes 115 that report their channel quality to the base station 120. In some embodiments, prior to reporting CQI information to the base station 120, the CQI reporting module 211 may compare the determined CQI information to a threshold value. (Step 314.) The threshold value may be a predetermined value stored in the nodes 115. Alternatively, the threshold value may be advertised by the base station 120 to the nodes 115 in a downlink transmission. The advertised value may correspond to the lowest (or several lowest) known channel quality for the nodes 115 in the local area 125 reported to the base station 120.

In addition, the number of nodes 115 reporting of CQI information to the base station 120 may be limited based on one or more rules. For example, the nodes 115 may be associated with a respective value, such as a random number (e.g., generated by the controller 200 or a separate random number generator), an identifier, a network address, etc. Using this value, the CQI reporting module 263 may use a rule to determine whether to send a CQI message to the base station 120. For instance, a rule may be that only a portion of the nodes 115 having an even value may report CQI information. Alternatively, a rule may be that, in a first time period, only the nodes 115 associated with an odd value may send CQI messages and, in a second time period, only the nodes 115 associated with an even value may send CQI messages. In addition, an exemplary rule may be that the nodes 115 having values in different ranges may send CQI messages in different time periods. By limiting which of the nodes 115 report CQI information and/or dividing the reports between different time periods, network congestion and transmission interference may be reduced. Such limitations may be useful in a local area that includes a large number of the nodes 115 (e.g., a stadium).

Figure 4:
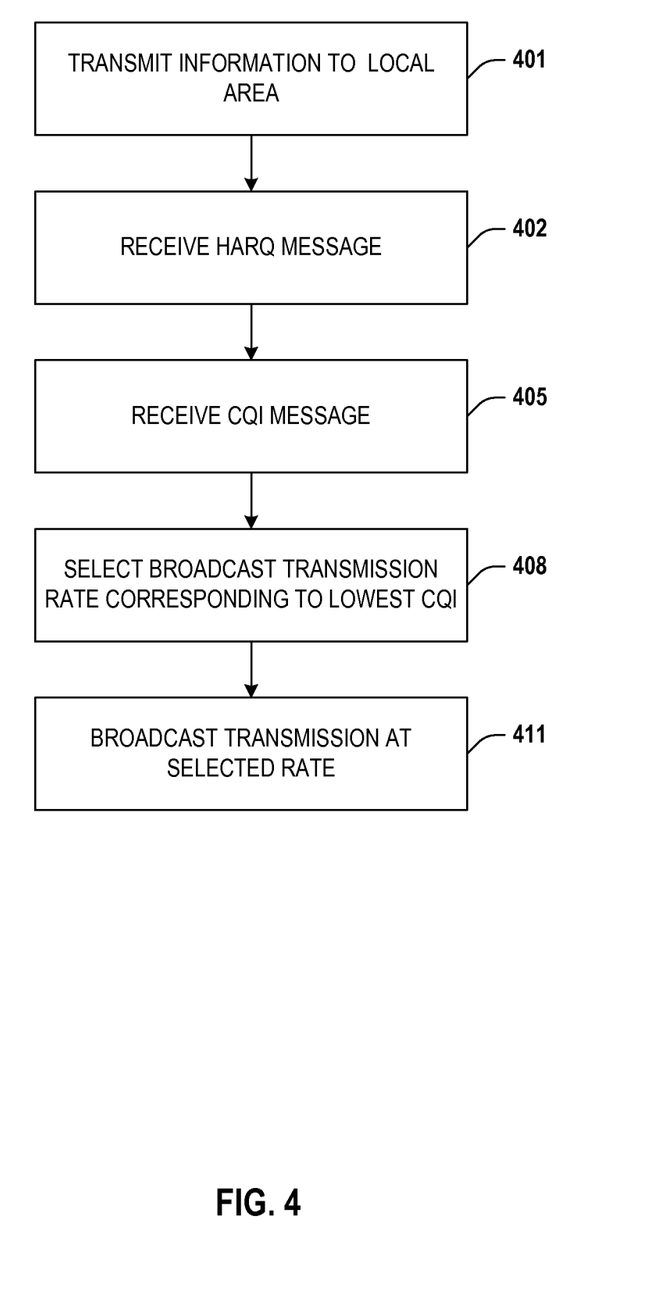
FIG. 4 illustrates an exemplary flow diagram of a process that may be performed by a base station.

FIG. 4 illustrates an exemplary process performed by a base station such as, for example, by the base station 120 shown in FIG. 2. The base station 120 may transmit information to the nodes 115 in the local area 125. (Step. 401.) In some embodiments, the transmissions from the base station 120 may include a CQI reporting threshold. The CQI reporting threshold may be a static value that is predetermined and stored in the base station 120. Alternatively, the CQI reporting threshold may be a dynamic value that is determined by the base station 120's CQI processing module 263 based on the CQI information received from the nodes 115. In other embodiments, the CQI reporting threshold corresponds to the CQI information reported by the node in the local area 125 having the lowest channel quality for the downlink channel 220, such as exemplary node 115C (i.e., the lowest geometry user).

The base station 120 may receive one or more HARQ messages via the HARQ channel 222 from the nodes 115. (Step 402.) Separately or concurrently, the base station 120 may receive one or more CQI messages from the CQI channel 221. (Step 405.) Based on the information included in the HARQ messages and/or the CQI messages, the adaptive transmission module 261 may dynamically select a transmission rate used by the broadcast module 269 to send transmissions to the nodes 115 over the downlink channel 220. By doing so, the base station 120 may adapt the parameters of the downlink channel 220 to ensure the nodes 115 in the local area 125 receive the downlink transmissions.

The base station 120 may receive a HARQ message from one or more of the nodes 115 in the local area 125 over the HARQ channel 222. In some embodiments, the HARQ messages may include a NAK message indicating that one of the nodes 115, such as node 115C, could not correctly decode a downlink transmission sent from the base station 120 over the downlink channel 220. In other embodiments, the nodes 115 only send a HARQ message to the base station 120 when the nodes 115 are unable to correctly decode a downlink transmission sent by the base station 120.

In the event that the HARQ processing module 265, based on the received HARQ messages, determines one or more of the nodes 115 failed to correctly decode a downlink transmission from that base station, that adaptive transmission module 261 may adapt the transmission rate for the downlink channel 220. (Step 408.) The transmission that was incorrectly decoded, which caused the NAK, may then be retransmitted at the adapted rate. Alternatively or additionally, the adaptive transmission module 261 may adapt the transmission rate for the downlink channel 220 based on CQI message received from one or more of the nodes 115.

The adaptive transmission module 261 may update the transmission rate in response received messages, and/or periodically. In some instances, the adaptive transmission module 261 may determine a transmission rate by selecting the rate from a lookup table stored in non-volatile memory 260 that includes transmission rates and corresponding CQI information. In other instances, the base station 120 may use an algorithm that calculates a transmission rate that is proportional to one or more of the lowest CQI information values received from the nodes 115.

Furthermore, the adaptive transmission module 261 may set the transmission rate to correspond to the lowest, or one of the lowest CQI information values received from the nodes 115 over the CQI channel 221. In some embodiments, the adaptive transmission module 261 may set the transmission rate based on short-term CQI information, such as the most recent CQI message(s) received. The transmission module 261 may also set the transmission rate based on long-term CQI information that may be recorded by the base station 120 over a period of time (e.g., several days). In other embodiments, the adaptive transmission module 261 may set the transmission rate without relying on CQI information received from the nodes 115. In such embodiments, the base station 120 may estimate the channel quality in the local area 125 based on statistical analyses. For instance, the CQI information may be determined based on an average (or median) channel quality for the local area 125 and the transmission rate set to correspond to an expected deviation from the average (or median). Such embodiments may be useful in areas, such as subway terminals, in which channel quality is consistency above a certain CQI value.

The broadcast module 269 may broadcast downlink transmissions to the nodes 115 over the downlink channel 220 using the transmission rate selected by the adaptive transmission module 261. (Step 411) The downlink transmissions may include the CQI broadcast threshold.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments disclosed herein, the functions described may be implemented in hardware, software, firmware or any combination thereof. If implemented in software, the functions may be stored on or encoded as one program instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instruction or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for adaptively transmitting information to a plurality of nodes in a local area of a base station, the method comprising:
    assigning each node in the plurality of nodes to at least one category in a plurality of categories based on a set of transmission characteristics;
    receiving channel quality information from one or more of the plurality of nodes within the local area of the base station;
    identifying at least one category of nodes in the plurality of categories to receive a transmission from the base station;
    selecting a transmission rate for a downlink transmission to nodes in the at least one category of nodes based on the received channel quality information, the selected transmission rate corresponding to one of the lowest channel qualities;
    simultaneously transmitting a same message to nodes in the at least one category of nodes at the selected transmission rate;
    receiving a request for retransmission of the same message from at least one node in the at least one category of nodes; and
    retransmitting the same message to—
        nodes in the at least one category of nodes, and
        nodes in at least one category of nodes having channel quality information lower than the at least one category of nodes,
    based on the request for retransmission.

2. The method of claim 1, wherein the channel quality information is received via a first uplink channel shared by the nodes.

3. The method of claim 1, wherein the base station selects the transmission rate based on a hybrid automatic repeat request (HARQ) message received by the base station, the HARQ message indicating that one of the nodes failed to correctly decode an earlier message transmitted by the base station.

4. The method of claim 3, wherein the base station receives the HARQ message from a single frequency network uplink channel.

5. The method of claim 1, wherein the channel-quality information includes a plurality of codes corresponding to a respective plurality of channel quality levels.

6. The method of claim 1, wherein the base station only receives channel quality information in the event that the channel quality of the nodes is less than a channel quality reporting threshold advertised by the base station.

7. The method of claim 6, wherein the base station determines the channel quality reporting threshold based on the channel quality information received from the nodes.

8. The method of claim 1, wherein the base station receives the channel quality information over a single frequency network uplink channel.

9. The method of claim 1, wherein the channel quality information is anonymous.

10. A base station that adaptively transmits information to a plurality of nodes in a local area of the base station, the base station comprising at least one processor and a memory device coupled to the at least one processor, the at least one processor being configured to:
    assign each node in the plurality of nodes to at least one category in a plurality of categories based on a set of transmission characteristics;
    receive channel quality information from one or more of the plurality of nodes within the local area;
    identify at least one category of nodes in the plurality of categories to receive a transmission from the base station;
    select a transmission rate for a downlink transmission to nodes in the at least one category of nodes based on the received channel quality information, the selected transmission rate corresponding to one of the lowest channel qualities;
    simultaneously transmit a same message to nodes in the at least one category of nodes at the selected transmission rate;
    receive a request for retransmission of the same message from at least one node in the at least one category of nodes; and
    retransmit the same message to—
        nodes in the at least one category of nodes, and
        nodes in at least one category of nodes having channel quality information lower than the at least one category of nodes,
    based on the request for retransmission.

11. The base station of claim 10, wherein the channel quality information is received via a first uplink channel shared by the nodes.

12. The base station of claim 10, wherein the at least one processor is further configured to select the transmission rate based on a hybrid automatic repeat request (HARQ) message received by the base station, the HARQ message indicating that one of the nodes failed to correctly decode an earlier message transmitted by the base station.

13. The base station of claim 12, wherein the at least one processor is further configured to receive the HARQ message from a single frequency network uplink channel.

14. The base station of claim 10, wherein the channel-quality information includes a plurality of codes corresponding to a respective plurality of channel quality levels.

15. The base station of claim 10, wherein the at least one processor is further configured to receive channel quality information only in the event that the channel quality of the nodes is less than a channel quality reporting threshold advertised by the base station.

16. The base station of claim 15, wherein the at least one processor is further configured to determine the channel quality reporting threshold based on the channel quality information received from the nodes.

17. The base station of claim 10, wherein the at least one processor is further configured to receive the channel quality information over a single frequency network uplink channel.

18. The base station of claim 10, wherein the channel quality information is anonymous.

19. A computer program product comprising a non-transitory computer-readable medium having program instructions stored thereon, further comprising code for causing at least one computer to:
  assign each node in the plurality of nodes to at least one category in a plurality of categories based on a set of transmission characteristics;
  receive channel quality information from one or more of the plurality of nodes within a local area of the base station;
  identify at least one category of nodes in the plurality of categories to receive a transmission from the base station;
  select a transmission rate for a downlink transmission to nodes in the at least one category of nodes based on the received channel quality information, the selected transmission rate corresponding to one of the lowest channel qualities;
  simultaneously transmit a same message to nodes in the at least one category of nodes at the selected transmission rate;
  receive a request for retransmission of the same message from at least one node in the at least one category of nodes; and
  retransmit the same message to—
    nodes in the at least one category of nodes, and
    nodes in at least one category of nodes having channel quality information lower than the at least one category of nodes,
  based on the request for retransmission.

20. The computer program product of claim 19, wherein the channel quality information is received via a first uplink channel shared by the nodes.

21. The computer program product of claim 19, wherein the program instructions further comprise code for causing at least one computer to select the transmission rate based on a hybrid automatic repeat request (HARQ) message received by the base station, the HARQ message indicating that one of the nodes failed to correctly decode an earlier message transmitted by the base station.

22. The computer program product of claim 21, wherein the program instructions further comprise code for causing at least one computer to receive the HARQ message from a single frequency network uplink channel.

23. The computer program product of claim 19, wherein the channel-quality information includes a plurality of codes corresponding to a respective plurality of channel quality levels.

24. The computer program product of claim 19, wherein the base station only receives channel quality information in the event that the channel quality of the nodes is less than a channel quality reporting threshold advertised by the base station.

25. The computer program product of claim 19, wherein the program instructions further comprise code for causing at least one computer to determine the channel quality reporting threshold based on the channel quality information received from the nodes.

26. The computer program product of claim 19, wherein the program instructions further comprise code for causing at least one computer to receive the channel quality information over a single frequency network uplink channel.

27. The computer program product of claim 19, wherein the channel quality information is anonymous.

28. A base station that adaptively transmits information to a plurality of nodes in a local area of the base station, the base station comprising:
  means for assigning each node in the plurality of nodes to at least one category in a plurality of categories based on a set of transmission characteristics;
  means for receiving over the network channel quality information from one or more of the plurality of nodes within the local area;
  means for identifying at least one category of nodes in the plurality of categories to receive a transmission from the base station;
  means for selecting a transmission rate for a downlink transmission to nodes in the at least one category of nodes based on the received channel quality information, the selected transmission rate corresponding to one of the lowest channel qualities;
  means for simultaneously transmitting a same message to nodes in the at least one category of nodes at the selected transmission rate;
  means for receiving a request for retransmission of the same message from at least one node in the at least one category of nodes; and
  means for retransmitting the same message to—
    nodes in the at least one category of nodes, and
    nodes in at least one category of nodes having channel quality information lower than the at least one category,
  based on the request for retransmission.

29. The base station of claim 28, further comprising means for selecting the transmission rate based on a hybrid automatic repeat request (HARQ) message received by the base station, the HARQ message indicating that one of the nodes failed to correctly decode an earlier message transmitted by the base station.

30. The base station of claim 28, wherein the base station only receives channel quality information in the event that the channel quality of the nodes is less than a channel quality reporting threshold advertised by the base station.

* * * * *